(12) United States Patent
Kovatchev

(10) Patent No.: US 9,894,731 B2
(45) Date of Patent: Feb. 13, 2018

(54) METHOD AND CIRCUIT APPARATUS FOR DETECTING A FAILURE OF AT LEAST ONE LIGHT EMITTING DIODE IN A LIGHT EMITTING DIODE ARRANGEMENT

(71) Applicant: Continental Automotive GmbH, Hannover (DE)

(72) Inventor: Emil Kovatchev, Vienna (AT)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/293,936

(22) Filed: Oct. 14, 2016

(65) Prior Publication Data

US 2017/0111963 A1 Apr. 20, 2017

(30) Foreign Application Priority Data

Oct. 14, 2015 (DE) ........................ 10 2015 219 903

(51) Int. Cl.
| | | |
|---|---|---|
| *H05B 33/08* | (2006.01) | |
| *B60Q 1/14* | (2006.01) | |
| *B60C 11/00* | (2006.01) | |

(52) U.S. Cl.
CPC ......... *H05B 33/089* (2013.01); *B60Q 1/1415* (2013.01); *H05B 33/083* (2013.01);
(Continued)

(58) Field of Classification Search
CPC ...... H05B 37/02; H05B 33/08; H05B 33/089; H05B 33/0815; H05B 33/083;
(Continued)

(56) References Cited

U.S. PATENT DOCUMENTS 8,558,463 B2 10/2013 Sato et al.
9,320,094 B2 * 4/2016 Szczeszynski ..... H05B 33/0815
(Continued)

FOREIGN PATENT DOCUMENTS

| DE | 102008008217 B4 | 8/2008 |
|---|---|---|
| DE | 102008047731 A1 | 3/2010 |
| DE | 102010002707 B4 | 11/2010 |

OTHER PUBLICATIONS

High-Brightness LED Malik Manager for Automotive Headlight Systems, Texas Instruments Matrix-LED-Treiber-IC TPS92661, 2016 http://www.ti.com/lit/ds/slusbu2/slusbu2.pdf.
(Continued)

*Primary Examiner* — Jimmy Vu

(57) ABSTRACT

A method for detecting a failure of at least one light emitting diode in a light emitting diode arrangement to which a supply current is applied by a constant-current source via a supply terminal and in which a respective luminous state of the light emitting diodes is set individually or in groups by means of a respective switching element by respective short-circuiting is disclosed, wherein a voltage signal of a chain voltage dropped across the light emitting diodes and dependent on the respective switching state of the switching elements is tapped off by a circuit apparatus at the supply terminal. The voltage signal is fed to an analog maximum value detector of the circuit apparatus, the maximum value detector is operated for a predetermined measurement duration and a maximum value signal of the voltage signal is provided at an output of the maximum value detector after the measurement duration.

19 Claims, 5 Drawing Sheets

(52) U.S. Cl.
CPC ..... *H05B 33/0815* (2013.01); *H05B 33/0845* (2013.01); *B60C 11/005* (2013.01)

(58) Field of Classification Search
CPC .... H05B 33/0845; B60Q 1/14; B60Q 1/1415; B60Q 11/005
USPC ........ 315/77–82, 113, 152, 209 R, 291, 307, 315/308, 312
See application file for complete search history.

(56) References Cited

U.S. PATENT DOCUMENTS

| | | |
|---|---|---|
| 2003/0160703 A1 | 8/2003 | Kurose |
| 2008/0238324 A1* | 10/2008 | Ishii ................... H05B 33/0812 315/77 |
| 2010/0264828 A1 | 10/2010 | Cortigiani et al. |
| 2012/0206146 A1 | 8/2012 | Avenel |

OTHER PUBLICATIONS

Dennis Simanaitis; LED Matrix Headlamps, Driving it Tomorrow, simaintissays.com, posted Sep. 23, 2013 http://simanaitissays.com/2013/09/23/led-matrix-headlights/.
Erfahrungen und tests für jedes auto, Auto Group GmbH, 2017 http://www.autoplenum.at/Bilder/testreports/artikel11801-bild05/.
https://www.youtube.com/watch?v=gxeTrMSn6Gk.

* cited by examiner

METHOD AND CIRCUIT APPARATUS FOR DETECTING A FAILURE OF AT LEAST ONE LIGHT EMITTING DIODE IN A LIGHT EMITTING DIODE ARRANGEMENT

BRIEF DESCRIPTION OF THE DRAWINGS

Exemplary embodiments of the invention are described below. In this respect, in the figures.

DETAILED DESCRIPTION

Figure 1:
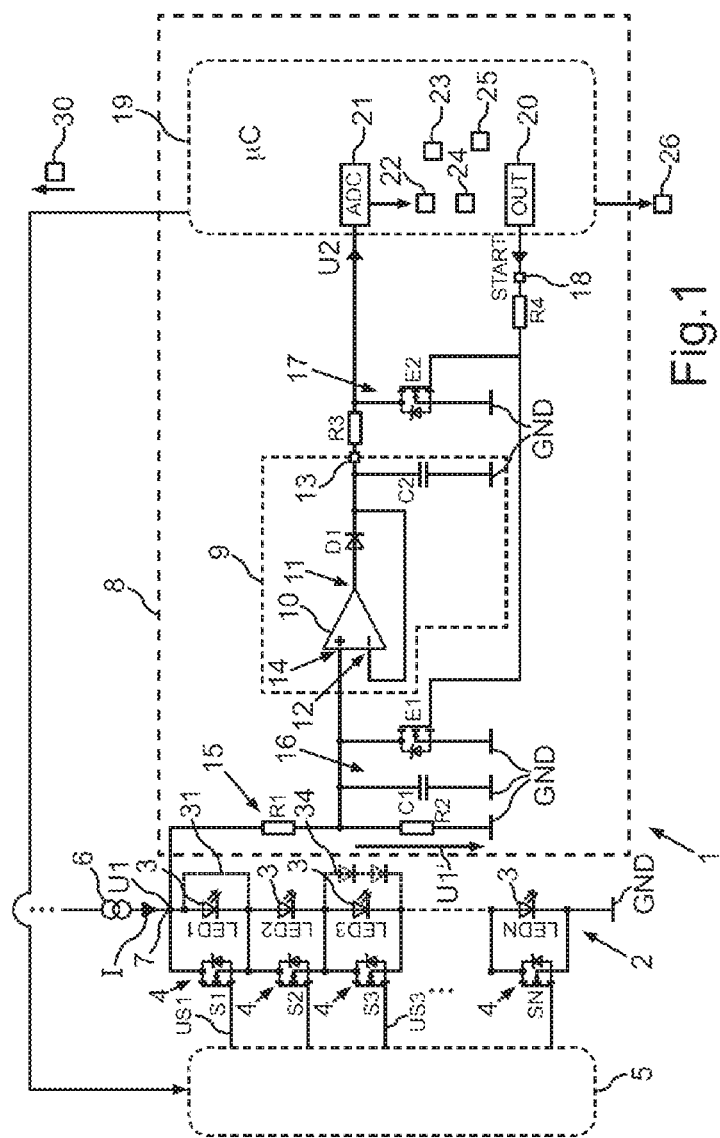
FIG. 1 shows a schematic circuit diagram of one embodiment of the lighting apparatus according to the invention.

The invention relates to a method for detecting a failure of at least one light emitting diode (LED) in a light emitting diode arrangement, in particular a light emitting diode matrix, having a plurality of light emitting diodes. The detection is effected at a supply terminal of the light emitting diode arrangement, via which the light emitting diode arrangement also receives a supply current. The invention also includes a circuit apparatus for carrying out the method, and a lighting apparatus comprising the light emitting diode arrangement and the circuit apparatus. The lighting apparatus can be configured in particular as a headlight for a motor vehicle.

A trend in automotive headlight design concerns so-called light emitting diode matrix headlights. In the case of such a matrix configuration, the light emitting diodes are combined in a plurality of rows and columns, for example 1×8, 3×5, 4×10.

In association with the invention, therefore, a light emitting diode matrix should be understood in particular also to mean an individual row or series of a plurality of light emitting diodes, e.g. 1×8.

In the context of the invention, however, a different geometrical arrangement of the light emitting diodes is also possible, for example a circular arrangement.

In the case of a light emitting diode matrix, the diagnosis of individual light emitting diodes with regard to short circuit or interrupted line (open load) turns out to be an extremely serious undertaking. Nevertheless this diagnosis is necessary particularly in the automotive sector, in order to warn a driver in the case of a defect of the headlight. The reason for the difficulty of the diagnosis is that the forward voltage of the individual light emitting diodes is a function of the supply current or light emitting diode current and the light emitting diode temperature and also the material and production parameters. Consequently, the forward voltage of the individual light emitting diode may already have a significant variation. Furthermore, a short-circuited light emitting diode does not necessarily constitute a low-impedance short circuit, rather a voltage which may be in a range of between 0 volts and 1.4 volts may still be dropped even across a short-circuited light emitting diode.

The diagnosis or checking of individual light emitting diodes by the corresponding interconnection of the individual light emitting diodes with a diagnosis circuit results in an excessively high circuitry outlay. By contrast, if the total voltage dropped across the entire light emitting diode matrix is measured, then as the number of light emitting diodes in the light emitting diode matrix increases, the problem arises that the target reliability of the diagnosis decreases since a difference between a functional light emitting diode having a low forward voltage, on the one hand, and a short-circuited light emitting diode having a high short-circuit voltage, in the chain voltage, brings about only a small percentage change that may lie in the range of the measurement accuracy of a diagnosis circuit.

By way of example, given a light emitting diode string or a light emitting diode row comprising eight light emitting diodes which have overall a chain voltage of 8×3.1 V=24.8 V in the fault-free state and at 500 mA and at 25° Celsius then the same light emitting diode string, but having a defective light emitting diode which has undergone breakdown upon the short circuit and which still has a residual voltage drop of approximately 1.0 V on account of its material properties, may likewise have 7×3.4 V+1.0 V=24.8 V at −20° Celsius and a light emitting diode current of 1200 mA. This would thus be indistinguishable from the fault-free state of the light emitting diode matrix.

A further problem in the evaluation of the total voltage between the supply terminals is that all the light emitting diodes must also actually be operated actively, that is to say must have the supply current applied to them. This is not always the case for switchable and/or dimmable light emitting diode matrix headlights. By way of example, it is known from U.S. Pat. No. 8,558,463 B2 that in a light emitting diode matrix the light emitting diodes can be switched individually or in groups. It is known from said document, for the diagnosis of the light emitting diodes, therefore, to interconnect individual light emitting diode groups alternately with a diagnosis circuit. This results in the high interconnection outlay described.

In the case, too, of motor vehicle headlights comprising a light emitting diode matrix, the light emitting diodes are switched in accordance with a predefined periodic dimming pattern. This can be achieved by means of switching elements which bridge or short-circuit a light emitting diode for the purpose of switching off or dimming said light emitting diode. The regulated supply current is then conducted past the respective light emitting diode. By opening the switching element, the supply current is driven through the light emitting diode.

In order to detect a failed or defective light emitting diode on the basis of the total voltage in the case of such a matrix headlight, the point in time at which all the light emitting diodes are intended to be operated must be known, however. Otherwise it is unclear whether a change in the total voltage was caused by a defective light emitting diode or by a light emitting diode bridged or short-circuited in accordance with the dimming pattern. However, the detection of said point in time likewise requires a high circuitry outlay.

The invention is based on the object of detecting the failure of at least one light emitting diode with little circuitry outlay in a light emitting diode arrangement.

The object is achieved by means of the subjects of the independent patent claims. Advantageous developments of the invention are provided by the features of the dependent patent claims.

The invention provides a method for detecting a failure of at least one light emitting diode in a light emitting diode arrangement, in particular in a light emitting diode matrix. A failure should be understood to mean both a short circuit, that is to say a breakdown, and an open circuit, that is to say an interruption, in the light emitting diode. The method proceeds from the fact that in the light emitting diode a supply current is applied to the light emitting diodes by a constant-current source via a supply terminal and a respective luminous state of the light emitting diodes is set individually or in groups by respective short-circuiting or bridging by means of a respective switching element. In other words, a switching element, for example a transistor, can thus in each case be connected in parallel with individual light emitting diodes, via which transistor the luminous state of the respective light emitting diode is set in the manner described. The control of the switching elements is set by a microcontroller, for example, in the case of a motor vehicle headlight, said microcontroller implementing the respective luminous program or dimming pattern.

The method now provides for a voltage signal of a chain voltage dropped across the light emitting diodes and dependent on the respective switching state of the switching elements to be tapped off by a circuit apparatus at the supply terminal. Therefore, the circuit apparatus does not have to be electrically connected to the individual light emitting diodes separately, but rather observes or receives only the voltage signal which arises at the supply terminal and which describes the chain voltage dropped across the light emitting diodes.

In order then to enable a diagnosis regarding a failure of at least one light emitting diode solely on the basis of this voltage signal, the invention provides for the voltage signal to be fed to an analog maximum value detector of the circuit apparatus. The maximum value detector is operated for a predetermined measurement time duration and provides a maximum value signal of the voltage signal at an output of the maximum value detector after the measurement time duration. The maximum value signal may thus be for example an analog voltage signal whose amplitude corresponds to or correlates with that maximum value of the voltage signal which the voltage signal had during the measurement time duration.

The invention affords the advantage that the point in time at which the voltage signal had the maximum value does not have to be known. By virtue of the fact that an analog maximum value detector observes the voltage signal for the measurement time duration, in the voltage signal the maximum value is continuously detected and reflected or signaled by the maximum value signal. Consequently, there is no need for a fast analog-to-digital converter that would have to be operated so fast that it would have to be able to detect even a very momentary rise in the voltage signal to the maximum value. In the case of the maximum value signal, it may now again be assumed that it describes the influence of all the light emitting diodes of the light emitting diode arrangement on the chain voltage. Specifically, if the measurement time duration is chosen to be long enough, then it should be assumed that all the light emitting diodes at least once were operated simultaneously by means of their associated switching element, that is to say that the associated switching element was switched to the open state. Consequently, with little circuitry outlay solely from the chain voltage it is possible to determine the influence of each light emitting diode on the chain voltage and thus to detect on the basis of the maximum value signal whether at least one light emitting diode in the light emitting diode arrangement has failed.

The term "all the light emitting diodes" here is taken to mean all the light emitting diodes (LEDs) which the application software that controls the switching elements operates permanently or in a pulsed manner in the present or concrete light scenario. They need not be all the light emitting diodes which are physically situated in a string (there may be e.g. 6 present). In the light beam of a motor vehicle headlight, the control software for the switching elements needs only a few, e.g. 4, while the remaining 2 are permanently bridged. Hereinafter, the number of application-required LEDs is referenced as "N", but this should not necessarily be equated with the number of LEDs actually fitted. However, the permanently bridged light emitting diodes do not need to be checked for their functionality because they are not used anyway.

The invention also includes optional developments whose features afford additional advantages.

In accordance with one development, the maximum value signal is transmitted to an analog-to-digital converter of a processor device of the circuit apparatus. The processor device identifies whether the maximum value signal satisfies a predetermined failure criterion. A fault signal is generated in the case of the failure criterion being satisfied. The failure criterion thus defines all those values of the maximum value signal which indicate a defective state of at least one light emitting diode. If the failure criterion is not satisfied, this means that the maximum value signal has a value which can arise in the case of a functional light emitting diode arrangement, that is to say if all the light emitting diodes are fault-free. The development affords the advantage that the digital evaluation by means of the processor device can be effected on the basis of a comparatively simple analog-to-digital converter since the conversion duration thereof for generating a digital value from an analog amplitude value of the maximum value signal can be greater than the minimum switch-on time of the switching elements of the light emitting diode arrangement that results from the switching clock duration and the resolution of the dimming pattern.

In accordance with one development, the failure criterion comprises the fact that a difference between the maximum value signal and a reference value lies outside a predetermined value interval. Providing a value interval has the advantage that both a light emitting diode that has undergone breakdown and a light emitting diode undergoing an open circuit can be detected. The lower limit of the value interval is undershot in the case of a light emitting diode that has undergone breakdown; the upper limit of the value interval is exceeded in the case of a light emitting diode undergoing an open circuit.

The reference value can be stored for example as a constant value in the circuit apparatus. By contrast, one development provides for the reference value to be adapted to the light emitting diode arrangement. In this development, the reference value is formed from the maximum value signal by virtue of the fact that for the measurement time duration the control elements of the light emitting diode arrangement remain uninfluenced by the circuit apparatus. In other words, the light emitting diode arrangement operates independently of the circuit apparatus. As a result, a switching state in which all the switching elements are switched into an open or nonconducting state is attained once within the measurement time duration. The then resulting value of the maximum value signal is used as reference value. For at least one further measurement duration, that is to say at least one further measurement process or measurement pass, the circuit apparatus generates in each case a control signal that results in one of the switching elements remaining closed throughout the measurement time duration, that is to say in an electrically conducting state. As a result, one of the light emitting diodes or a group of light emitting diodes is then electrically short-circuited or bridged in a targeted manner. On the basis of the resulting difference between the reference value (all the switching elements in the electrically blocking state) and the maximum value signal with a permanently closed switching element, the influence which an individual light emitting diode or a specific group of light emitting diodes has on the chain voltage can then be determined. If this influence does not lie within the value interval described, then a defective or failed light emitting diode is detected. This development thus enables an individual diagnosis for individual light emitting diodes or partial groups of light emitting diodes within the light emitting diode arrangement.

One development relates to a light emitting diode arrangement in which the switching elements are switched periodically by means of a pulse width modulation in accordance with a predetermined dimming pattern. A period duration of the pulse width modulation can be less than 10 milliseconds, for example. To the human eye, on account of the inertia of visual perception, this results in flicker-free light with a brightness that is defined by the dimming pattern. In this development, the measurement time duration for detecting the maximum value signal is chosen to the effect that it corresponds at least to the period duration of the dimming pattern. This affords the advantage that the measurement or detection of the maximum value signal is independent of a starting time of a period of the dimming pattern.

Accordingly, one development provides for the circuit apparatus to be operated asynchronously with respect to the time switching of the pulse width modulation. In other words, the circuit apparatus operates independently or in a phase-shifted manner with respect to the pulse width modulation of the light emitting diode arrangement. This affords the advantage that complex synchronization via a synchronization line, for example, is not necessary.

In accordance with one development, the voltage signal tapped off is filtered by a low-pass filter device before it is fed to the maximum value detector. This affords the advantage that the maximum value signal is not raised undesirably to a maximum value that can arise as a result of transient voltage spikes upon the switching of the switching elements. Said maximum value is not representative of the state of the light emitting diodes. An electrical circuit having a filter capacitor can be provided as the low-pass filter device.

One development provides for the voltage signal to be tapped off via a voltage divider. As a result, the maximum value signal can be adapted to an input level of the analog-to-digital converter.

In accordance with one development, a beginning of the measurement time duration is defined by a trigger signal by virtue of the fact that in the maximum value detector the maximum value signal is reset depending on the trigger signal. By way of example, a storage capacitor across which the maximum value signal is dropped as voltage signal can be emptied or discharged. This development affords the advantage that the maximum value detector is operated passively and the measurement time interval, that is to say the beginning of the measurement time duration, can be defined by a different component of the circuit apparatus, for example the processor device described.

The invention also includes a circuit apparatus for carrying out the method according to the invention. The circuit apparatus is thus provided for detecting a failure of at least one light emitting diode in a light emitting diode arrangement, in particular in a light emitting diode matrix. The circuit apparatus comprises a measurement input for receiving a voltage signal from a supply terminal of the light emitting diode arrangement. An analog maximum value detector is coupled to the measurement input. A measurement output is coupled to the maximum value detector and is provided for outputting a maximum value signal of the maximum value detector. The circuit apparatus according to the invention has the advantage that it can be coupled to the supply terminal of the light emitting diode arrangement and, after the measurement time duration, provides at the measurement output a maximum value signal whose amplitude value correlates with the state of the light emitting diodes even if individual light emitting diodes have been turned off occasionally during the measurement time duration.

In accordance with one development, the maximum value detector is formed by virtue of the fact that in an operational amplifier an output is electrically connected via a forward-biased diode both to a capacitor and to an inverting input of the operational amplifier and the measurement output is electrically connected to the capacitor and the measurement input is electrically connected to a noninverting input of the operational amplifier. This maximum value detector can be provided using inexpensive and available electronic and electrical components and thus makes configuring the circuit apparatus particularly inexpensive and technically simple.

One development provides for a processor device to be provided, which is interconnected with the measurement output via an analog-to-digital converter and which is designed to identify whether the maximum value signal satisfies a predetermined failure criterion and to generate a fault signal in the case of the failure criterion being satisfied. As a result, the circuit apparatus carries out the complete diagnosis by the failure of at least one light emitting diode being signaled by means of the fault signal.

In accordance with one development, the circuit apparatus comprises a trigger input for receiving a trigger signal or release signal. A discharge device is designed to discharge the capacitor depending on the trigger signal. The beginning of the measurement time duration or of the measurement interval can thus be designed as a result. The discharge device can be formed for example by a switch, for example a transistor. In the case of a discharge device comprising a transistor, the trigger signal can be configured as a voltage pulse.

As an alternative thereto, a control output of a microcontroller can be provided as the discharge device. By switching the control output to "low", a current from the capacitor, passed via the control output, is likewise dissipated to a ground potential since the control output is coupled to the ground potential with low impedance if it is switched to low.

The circuit apparatus also includes further developments having features such as have already been described in association with the developments of the method according to the invention. For this reason, the corresponding developments of the circuit apparatus according to the invention are not described again here. Finally, the invention also includes the combination of a light emitting diode arrangement, in particular a light emitting diode matrix, and the circuit apparatus according to the invention. The lighting apparatus according to the invention thus comprises a light emitting diode arrangement comprising a plurality of light emitting diodes, in particular a light emitting diode matrix comprising a plurality of light emitting diodes, and an embodiment of the circuit apparatus according to the invention which is interconnected with or coupled to a supply terminal of the light emitting diode arrangement. Via the supply terminal, the light emitting diode arrangement can also receive the supply current from a current source.

The lighting apparatus can be embodied in particular as a motor vehicle headlight.

The exemplary embodiments explained below are preferred embodiments of the invention. In the exemplary embodiments, the described components of the embodiments in each case constitute individual features of the invention which should be considered independently of one another and which develop the invention in each case also independently of one another and should thus also be regarded as part of the invention individually or in a different combination than that shown. Furthermore, the embodiments described can also be supplemented by further features from among the already described features of the invention.

In the figures, functionally identical elements are in each case provided with the same reference signs.

FIG. 1 shows a lighting apparatus 1, which can be for example a motor vehicle headlight. The lighting apparatus 1 comprises a light emitting diode arrangement 2 in the form of a light emitting diode matrix, which can have a plurality of light emitting diodes 3. A total number N of the light emitting diodes 3 can be greater than 3, for example. Ellipses symbolize that the total number N can be greater or less than the total number N=4 illustrated in FIG. 1. In order to differentiate the light emitting diodes 3, the light emitting diodes 3 are differentiated by respective identifiers LED1 to LEDN. A respective switching element 4 is connected in parallel with each light emitting diode 3, said switching elements being individually designated by the designations S1, S2, S3, . . . SN. Each switching element 4 can be in each case a transistor, for example. The switching elements 4 can be switched by a control device 5 in order to set a total brightness in the lighting apparatus 1.

A supply current I is applied to the light emitting diodes 3 of the light emitting diode arrangement 2 by a current source 6, which supply current is impressed into the light emitting diode arrangement 2 via a supply terminal 7 and can flow away via a ground potential 8.

In the example shown in FIG. 1, the light emitting diodes 3 and the light emitting diode arrangement 2 are interconnected by way of example as a series connection. By switching the switching elements 4, the control device 5 defines whether or not the light emitting diode 3 respectively connected in parallel emits light. For this purpose, the control device 5 can be provided for example as a microcontroller or processor device. The switching elements 4 can be driven individually. By closing a respective switching element 4, the light emitting diode 3 connected in parallel is bridged or short-circuited, such that it does not emit light. The switching elements 4 here are switched in a phase-shifted manner by the control device 5 in each case by means of a PWM signal (pulse width modulation), in order thereby to reduce a loading of the current source 6 on account of the resulting step response of the light emitting diode arrangement 2.

Figure 2:
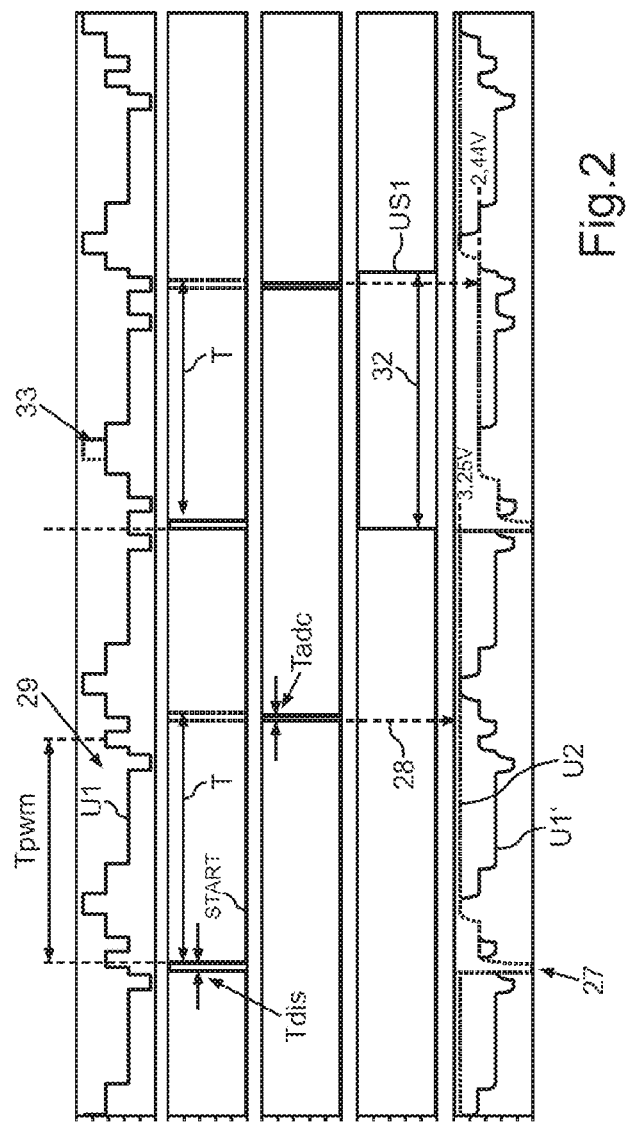
FIG. 2 shows a diagram with schematic time profiles of voltage signals such as can occur in the lighting apparatus from FIG. 1.

A frequency or period duration Tpwm is illustrated in FIG. 2. FIG. 2 furthermore shows how a chain voltage U1 arises overall across the light emitting diode arrangement 2 at the supply terminal 7.

The lighting apparatus 1 furthermore comprises a circuit apparatus 8, by means of which, on the basis of the chain voltage U1, it is possible to ascertain whether one of the light emitting diodes 3 is defective and as a result does not emit light, but is nevertheless electrically conducting, that is to say has permanently undergone breakdown or been short-circuited. Independently of the timing of the control device 5 for switching the switching elements 4, the circuit apparatus 8 generates a maximum value signal U2 of the chain voltage U1 and stores this. The maximum value signal U2 is correlated with the number of active or functional light emitting diodes 3, as being for the light emitting diode diagnosis. In this case, the circuit apparatus 8 satisfies the following requirements. It detects the respective maximum value signal U2 of the light emitting diode chain voltage U1 at a predefined point in time and stores this. In this case, it can be started at an arbitrary point in time, such that, beginning at the starting time, it analyzes the chain voltage U1 for a predefined measurement time duration T in order to generate the maximum value signal U2. It can thus be operated asynchronously with respect to other processor devices, in particular asynchronously with respect to the control device 5 for controlling the switching elements 4, without the functionality thereof being impaired as a result. Moreover, it is cost-effective and saves resources in order that its use instead of fully integrated solutions is worthwhile.

In this case, the circuit apparatus 8 is operated in accordance with a method which turns off a respective individual light emitting diode 3 for a time duration imperceptible to the human eye, namely during an individual period Tpwm of the switching cycles of the switching elements 4. One of the light emitting diodes 3 is respectively alternately turned off completely for the entire period duration Tpwm, as a result of which the light emitting diode 3 is checked individually and/or specifically as to whether it is functional. The diagnosis or checking of functionality is robustly and reliably checked for plausibility.

The circuit apparatus 8 comprises a maximum value detector 9 for the diagnosis described. The maximum value detector 9 can be formed for example on the basis of an operational amplifier 10, the output 11 of which can be interconnected via a forward-biased diode D1 firstly with an inverting input 12 and secondly with a storage capacitor or capacitor C2. The voltage dropped across the capacitor C2 can be tapped off as the maximum value signal U2 at a measurement output 13. A noninverting input 14 of the operational amplifier 10 is interconnected with the supply terminal 7 via a voltage divider 15. The voltage divider 15 generates a correlated voltage U1' from the chain voltage U1 via two resistance elements R1, R2. The correlated voltage U1' can be filtered by a low-pass filter device 16, as a result of which sporadic voltage spikes are smoothed. The low-pass filter device 16 can be provided for example on the basis of a capacitor C1. The correlated voltage U1' filtered or smoothed by means of the low-pass filter device 16 is provided at the noninverting input 14 of the operational amplifier 10.

For discharging the capacitor C2 at the output 13 of the maximum value detector 9, the latter can be reset to an initial value by means of a discharge device 17, that is to say that the capacitor C2 can be discharged via the discharge device 17. The discharge device 17 can be provided on the basis of a transistor E2. For controlling the discharge device 17, a trigger input 18 is provided, which can be controlled by a processor device 19. The processor device 19 can be a microcontroller, for example. The trigger input 18 can be interconnected with a control output 20 of the processor device 19. At the trigger input 18, the processor device 19 generates a trigger signal START. A duration of the trigger signal START can be in a range of 50 microseconds to 200 microseconds, for example. The capacitor C2 is then discharged via the ground potential GND. The discharge device 17 can also comprise a second transistor E1, via which the capacitor C1 of the low-pass filter device 16 can likewise be discharged.

The processor device 19 receives the maximum value signal U2 at an analog-to-digital converter 21. By means of the analog-to-digital converter 21, a maximum value 22 is generated from the maximum value signal U2, which maximum value can be compared with a reference value 23. By way of example, a difference 24 between the maximum value 22 and the reference value 23 can be determined. If the difference 24 satisfies a predetermined failure criterion 25, the processor device 19 generates a failure signal 26 which signals that one of the light emitting diodes 3 is defective. The failure criterion 25 can define for example a value range within which the difference 24 must lie in order that the failure signal 26 is not defined. If the difference 24 thus lies outside the value interval, then the failure signal 26 is generated.

In order, by means of the circuit apparatus 8, to check for each individual light emitting diode 3 whether the latter is defective, the switching combination of the switching elements 4, such as is set by the control device 5 in accordance with the PWM switching pattern with the PWM period duration Tpwm described, is detected in an uninfluenced manner once for a measurement time duration T. In other words, by means of the trigger signal START by discharging the capacitor C2 the maximum value signal U2 is reset to a reset value 27 and for the duration of the PWM period Tpwm plus the sampling time Tadc of the analog-to-digital converter 21, the maximum value signal U2 is generated depending on the converted chain voltage U1'. The resulting voltage profile is illustrated in FIG. 2. FIG. 2 shows that the converter time 28 at which the maximum value 22 is generated can be chosen independently of the profile of the dimming pattern 29. In other words, the maximum value detector 9 can be operated asynchronously or independently with respect to the control device 5.

In a further measurement cycle, the processor device 19 generates a control signal 30 by which, via the control device 5, one of the switching elements 4 is switched into the electrically conducting state for the duration of a measurement period for generating the maximum value signal U2, such that the light emitting diode 3 correspondingly connected in parallel is permanently bridged or short-circuited. In the example illustrated in FIG. 2, for this purpose, a control signal US1 for switching the switching device S1 for the light emitting diode LED1 is generated as the control signal 30. This is symbolized in FIG. 1 symbolically by a short circuit 31 for the duration of the measurement period 32. This results in a chain voltage U1 for which the maximum value lacks a period section 33 in which all the switching elements 4 are nonconducting, that is to say that all the light emitting diodes 3 are operated. Accordingly, a lower chain voltage results. In the manner described the chain voltage U1 is divided by the voltage divider 15, filtered by the low-pass filter device 16 and is then present at the noninverting input 14 of the operational amplifier 10 as U1'. The capacitor C1 has been discharged via the transistor E1 beforehand.

The amplifier 10 together with the diode D1 and the negative feedback at the inverting input 12, which is led from the diode cathode of the diode D1 to the inverting input 12, always charges the capacitor C2 to the maximum value of the voltage U1'.

The capacitor C2 has been discharged beforehand by means of the trigger signal START via a protective resistor R3 in order that it only stores the maximum value 22 for the respective measurement time duration T. After the PWM period Tpwm plus the sampling time Tadc of the analog-to-digital converter 21 has elapsed, it is possible to carry out sampling of the sample at the analog-to-digital converter 21. Consequently, the maximum chain voltage U2, if all the light emitting diodes are active simultaneously, is ensured and stored as maximum value 22.

In this regard, therefore, at an arbitrary point in time, one of the light emitting diodes 3 to be diagnosed can be bridged by means of the control signal 30. This should take place at least over a PWM period Tpwm plus the sampling time Tadc of the analog-to-digital converter 21 in order that it can be ensured that the voltage maximum has been reached. Directly after the bridging of a light emitting diode, the diagnosis can be started by renewed discharging of the capacitors C1, C2. Afterward, there is a wait until a PWM period Tpwm plus discharge time for the capacitors C1, C2 has elapsed, in order that the maximum of the instantaneous converted characteristic voltage U1' is established. Afterward, the maximum value signal U2 can be sampled again.

In the example illustrated in FIG. 2 (N=4), in the case of uninfluenced switching elements 4, if the control signal 30 is not generated, this results in a maximum chain voltage in the case of four light emitting diodes which is U2=3.25 volts. If the short circuit 31 is generated by means of the control signal 30, for example, then U2=2.44 volts results as maximum value signal. The omitted maximum 33 is thus 3.25 volts−2.44 volts=0.81 volt.

Given a ratio of the voltage divider 15 of R1:R2=3:1, this corresponds to a light emitting diode voltage of 4×0.81 volt=3.24 volts for the light emitting diode LED1. This is a typical value for a forward voltage of a light emitting diode which is functional. Consequently, the light emitting diode LED1 is in order.

Figure 3:
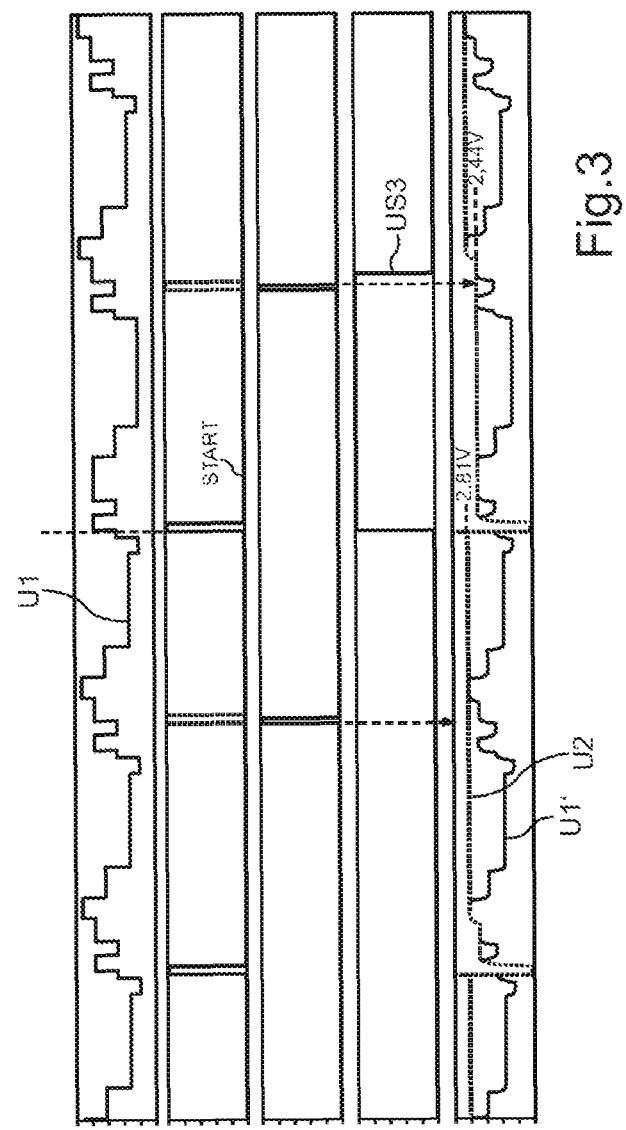
FIG. 3 shows a diagram with further schematic time profiles of voltage signals such as can occur in the lighting apparatus from FIG. 1.

FIG. 3 illustrates an example in which it is assumed that the light emitting diode LED3 is defective, that is to say that it is permanently electrically conducting. In FIG. 1 this is symbolized by a bridging circuit 34 being connected in parallel with the light emitting diode LED3, virtually or fictitiously, said bridging circuit being represented by two diodes. This symbolizes the fact that the light emitting diode LED3 has a forward voltage that is only 1.4 volts instead of the nominal 3.24 volts.

FIG. 3 illustrates how a maximum value signal of U2=2.81 volts therefore results in the case of uninfluenced switching elements 4, if the control signal 30 is not generated. By generating the control signal 30 that generates a switching signal US3 for the switching element S3 for bridging the light emitting diode LED3, this results in a maximum value signal U2=2.44 volts. The difference is thus 2.81 volts−2.44 volts=0.37 volt. Given R1:R2=3:1, this corresponds to a light emitting diode voltage of 4×0.37 volt=1.48 volts for the light emitting diode LED3. Consequently, the light emitting diode LED3 is not in order since it has an excessively low forward voltage, that is to say that it must be defective (have undergone breakdown).

Figure 4:
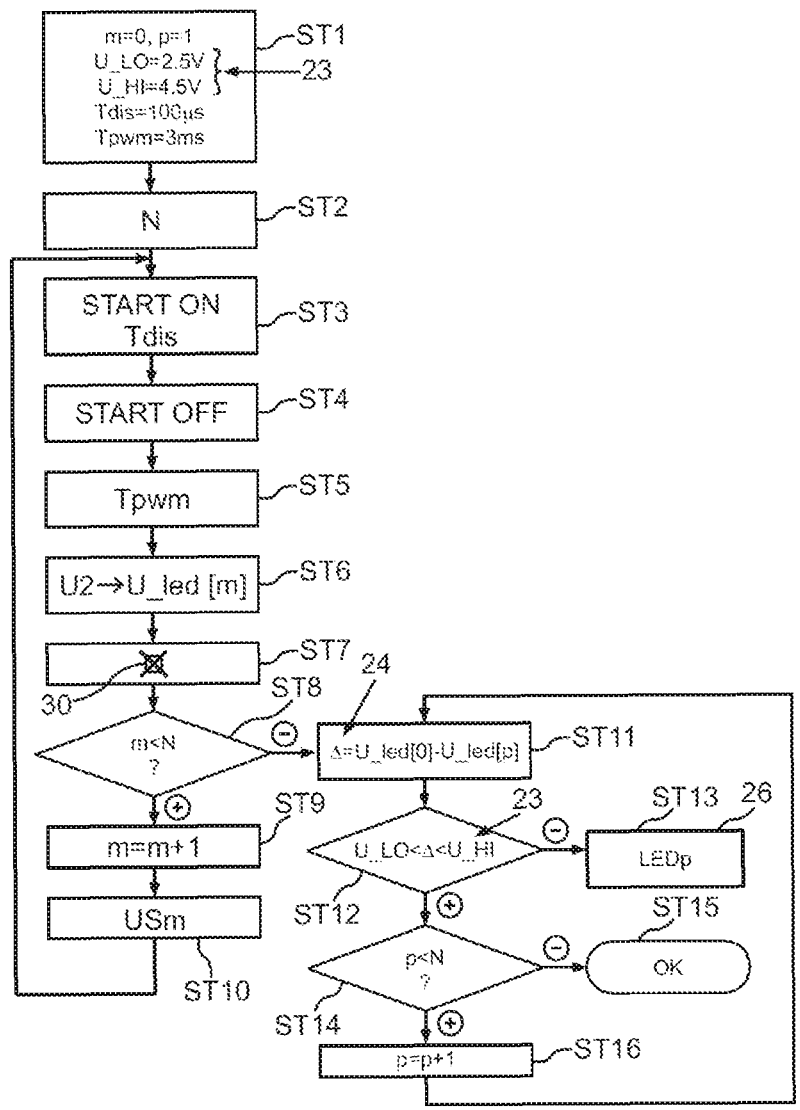
FIG. 4 shows a flow diagram concerning one embodiment of the method according to the invention such as can be carried out by a circuit apparatus of the lighting apparatus from FIG. 1.

FIG. 4 illustrates the overall sequence of the method by which each light emitting diode 3 is checked individually for a defect. In a step ST1, a diode counter m=0 and a test counter p=1 are set in the processor device 19. A value interval U_LO-U_HI which defines a value interval for functional light emitting diodes can be defined as failure criterion 23. For controlling the discharge device 17, a discharge time duration Tdis can be set to 100 microseconds, for example. Furthermore, in the processor device 19, the PWM period duration is determined, for example read out as a permanently stored value. By way of example, a PWM period duration of 3 milliseconds is determined here, such as can be provided by the control device 5 for setting the dimming pattern 29.

The total number N of light emitting diodes 3 to be checked is determined in a step ST2. The total number N can be permanently stored in the processor device 19. In a step ST3, the trigger signal START is switched by means of the discharge device 17 for the time duration Tdis, as a result of which the capacitors C1, C2 are discharged. In a step ST4, the trigger signal START is reset, such that the capacitors C1, C2 can store voltage from thereon.

In a step ST5, by means of the maximum value detector 9 in the capacitor C2 the maximum value signal U2 is generated at least for the PWM period duration Tpwm. Afterward, in a step ST6, the maximum value 22 is generated in the analog-to-digital converter 21, said maximum value being stored in an array Uled[m]. As a result, in the step ST6, in the case of uninfluenced switching elements 4, the reference value 23 is available as Uled[0]. In a step ST7, the control signal 30 is reset.

A step ST8 involves checking whether even further light emitting diodes are to be checked. If this is the case (plus symbol "+"), the light emitting diode counter m is incremented in a step ST9. In a step ST10, the control signal 30 is thereupon generated for the present light emitting diode m to the effect that the light emitting diode LEDm, by means of a corresponding control signal USm, is permanently short-circuited by means of the parallel-connected switching element Sm for a measurement time duration T. Step ST3 is thereupon repeated, that is to say that the capacitors C1, C2 are discharged and subsequently, in accordance with the flow diagram 4, the maximum value signal U2 is generated again and the resulting maximum value 22 is stored in the array Uled[m].

If, in the then repeated step ST8, it is ascertained that all the light emitting diodes have been checked (minus symbol "−"), in a step ST11 for each light emitting diode the difference 24 is calculated as delta value Δ and for each delta value Δ the failure criterion 23 is checked in a step ST12, that is to say that a check is made to determine whether the delta value Δ lies within the value interval U_LO-U_HI. If this is not the case (minus symbol "−"), then in a step ST13 the fault signal 26 is generated for the currently checked light emitting diode LEDp. If the light emitting diode LEDp is in order (plus symbol "+"), then a step ST14 involves checking whether even further the light emitting diodes are to be checked. If this is not the case (minus symbol "−"), then in a step ST15 the method is ended and all the light emitting diodes are signaled as OK. Otherwise (plus symbol "+"), in a step ST16 the test counter p is incremented and the delta value Δ is calculated for the next light emitting diode in step ST11.

Therefore, this results in a dynamic diagnosis during the PWM operation of light emitting diodes 3 of a light emitting diode arrangement 2. The method presented here constitutes in practice an almost real-time diagnosis during clocked PWM operation. The proposed circuit stores the maximum value 22 of the LED chain voltage U1 at the latest after a PWM period Tpwm, independently of the PWM timing. This is important in this respect since the light emitting diodes 3 in a matrix configuration are operated intensively and predominantly in PWM operation. In this case, no optical variation of the brightness which might be perceived by an observer arises in this diagnosis mode. The diagnosis method requires somewhat longer than one PWM period Tpwm per light emitting diode 3 for the voltage detection. This means that the light emitting diode 3 to be tested does not emit light only for a PWM period Tpwm. Assuming that the PWM period Tpwm typically has a length of 3 to 4 milliseconds, which corresponds to 333 hertz to 250 hertz, even half the dimming frequency, 166 hertz to 125 hertz, for the short diagnosis duration is imperceptible, especially since the human eye perceives brightness fluctuations only below 70 to 80 hertz.

A complete diagnosis of individual light emitting diodes, that is to say an individual LED diagnosis, is also provided. By detecting the voltage difference between light emitting diode chain voltage with all the light emitting diodes on and the LED chain voltage with the light emitting diode to be diagnosed, de facto the voltage drop of each individual light emitting diode 3 is determined and checked for plausibility. Consequently, no excessively long fault chains arise, since exclusively exactly the voltage which is dropped across the individual light emitting diode and is relevant to the individual LED diagnosis is measured.

In this case, a low processor load of the processor device 19 also results, since the use of the purely analog maximum value memory of the maximum value detector 9 and its driving frees the processor device 19 of the continual analog-to-digital converter sampling of the entire signal of the chain voltage U1. The resources of the processor device 19 are used only sporadically by the diagnosis routine, and then only for a short time and with noncritical timing. The timing is noncritical in particular to the effect that the maximum light emitting diode chain voltage value is determined and stored in analog fashion and the analog-to-digital converter 21 does not have to carry out sampling synchronously with the PWM pulses of the control device 5, which constitutes a relief for the control software of the processor device 19 and the hardware. In many cases the synchronization of the ADC sampling (ADC—analog-to-digital converter) relative to the PWM is not even possible in the first place. The circuit method shown here is applicable to any arbitrary hardware solution and choice of processor device 19, assuming that an individual LED driving by means of the control signal 30 for bridging the switching elements 4 is made possible.

As already described the tolerance chain of the measurement method is very short and manageable. It substantially consists of the ADC accuracy of the analog-to-digital converter 21 (resolution, quantization error, offset, reference voltage), which is readily controllable in modern microcontrollers, and the tolerance of the voltage divider 15 (initially as a result of the tolerances of the resistors R1, R2 and the temperature dependence) and also the properties of the operational amplifier 10 (offset, bias), which are negligible in the case of the relatively high voltages to be measured and the gain with the factor 1. The voltage drop of individual light emitting diodes is always determined; there is no need for temperature- and current-dependent LED chain models in which the error would accumulate with increasing chain length.

The circuit apparatus 8 needs only a small number of widely used components, namely an operational amplifier, a small diode and a few resistors and ceramic capacitors for each light emitting diode arrangement 2 to be monitored.

Figure 5:
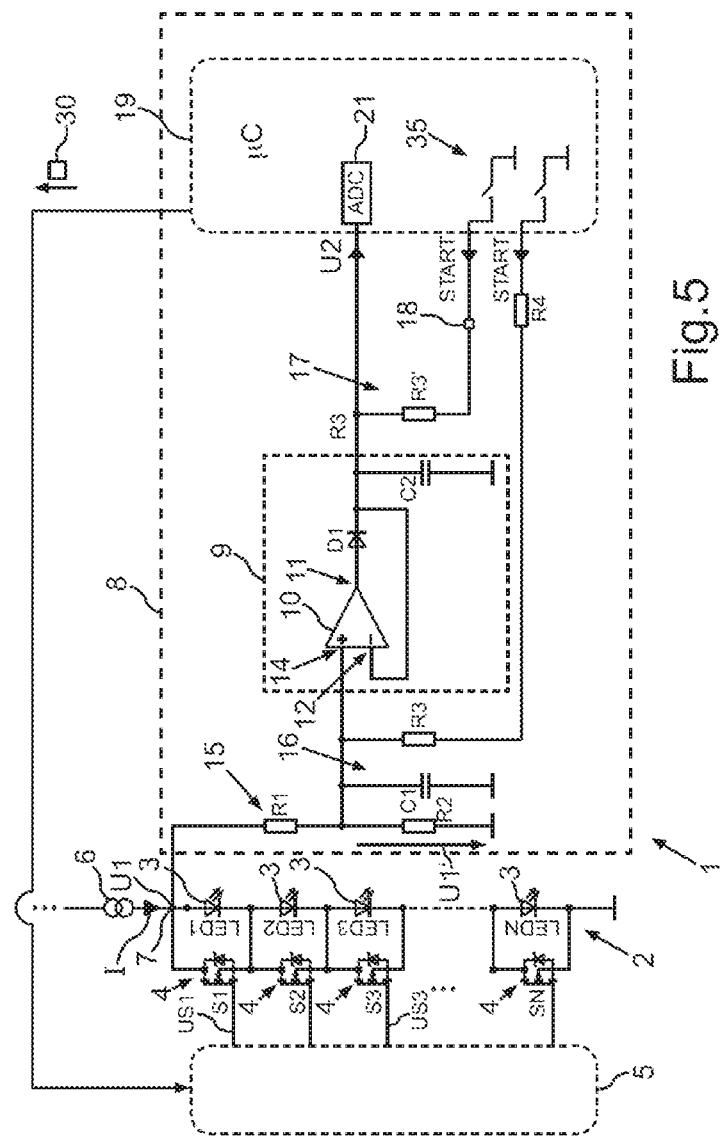
FIG. 5 shows a schematic circuit diagram of an alternative embodiment of the lighting apparatus according to the invention.

In this respect, FIG. 5 also presents an alternative realization variant, in which microcontroller-internal transistors can also be used for discharging the storage capacitors C1, C2 by virtue of the latter being interconnected with open-drain control outputs 35 via discharge resistors R3, R3'.

Overall, the example shows how the invention makes it possible to provide a method and a circuit for the diagnosis of individual LEDs in an LED matrix.

The invention claimed is:

1. A method for detecting a failure of at least one light emitting diode in a light emitting diode arrangement to which a supply current is applied by a constant-current source via a supply terminal and in which a respective luminous state of the light emitting diodes is set individually or in groups by means of a respective switching element by respective short-circuiting, comprising:
    tapping off by a circuit apparatus at the supply terminal a voltage signal of a chain voltage dropped across the light emitting diodes, the voltage signal dependent on the respective switching state of the switching elements,
    feeding the voltage signal to an analog maximum value detector of the circuit apparatus,
    operating the maximum value detector for a predetermined measurement time duration and
    providing a maximum value signal of the voltage signal at an output of the maximum value detector after the measurement time duration.

2. The method as claimed in claim 1, wherein the maximum value signal is transmitted to an analog-to-digital converter of a processor device of the circuit apparatus and the processor device identifies whether the maximum value signal satisfies a predetermined failure criterion, and wherein a fault signal is generated in the case of the failure criterion being satisfied.

3. The method as claimed in claim 2, wherein the failure criterion comprises the fact that a difference between the maximum value signal and a reference value lies outside a predetermined value interval.

4. The method as claimed in claim 3, wherein the reference value is formed from the maximum value signal by virtue of the fact that for the measurement time duration the control elements of the light emitting diode arrangement remain uninfluenced by the circuit apparatus and for at least one further measurement time duration the circuit apparatus generates in each case a control signal that results in one of the switching elements remaining closed throughout the measurement time duration.

5. The method as claimed in claim 1, wherein in the light emitting diode arrangement the switching elements are switched periodically by means of pulse width modulation in accordance with a predetermined dimming pattern, and wherein the measurement time duration corresponds at least to the period duration of the dimming pattern.

6. The method as claimed in claim 5, wherein the circuit apparatus is operated asynchronously with respect to the time switching of the pulse width modulation.

7. The method as claimed in claim 1, wherein the voltage signal tapped off is filtered by a low-pass filter device before it is fed to the maximum value detector.

8. The method as claimed in claim 1, wherein the voltage signal is tapped off via a voltage divider.

9. The method as claimed in claim 1, wherein a beginning of the measurement time duration is defined by a trigger signal by virtue of the fact that in the maximum value detector the maximum value signal is reset depending on the trigger signal.

10. A circuit apparatus for detecting a failure of at least one light emitting diode in a light emitting diode arrangement, comprising:
    a measurement input for receiving a chain voltage from a supply terminal of the light emitting diode arrangement,
    an analog maximum value detector,
    a measurement output for outputting a maximum value signal of the maximum value detector.

11. The circuit apparatus as claimed in claim 10, wherein the maximum value detector comprises an operational amplifier with an output electrically connected via a forward-biased diode both to a capacitor and to an inverting input of the operational amplifier,
    wherein the measurement output is electrically connected to the capacitor, and
    wherein the measurement input is electrically connected to a noninverting input of the operational amplifier.

12. The circuit apparatus as claimed in claim 11, further comprising:
    a processor device interconnected with the measurement output via an analog-to-digital converter, the processor device configured to identify whether the maximum value signal satisfies a predetermined failure criterion and configured to generate a fault signal in the case of the failure criterion being satisfied.

13. The circuit apparatus as claimed in claim 12 further comprising:
    a discharge device, the discharge device comprising a trigger input for receiving a trigger signal,
    wherein the discharge device is configured to discharge the capacitor depending on the trigger signal.

14. The circuit apparatus as claimed in claim 10, further comprising:
    a processor device interconnected with the measurement output via an analog-to-digital converter, the processor device configured to identify whether the maximum value signal satisfies a predetermined failure criterion and configured to generate a fault signal in the case of the failure criterion being satisfied.

15. The circuit apparatus as claimed in claim 10 further comprising:
    a discharge device, the discharge device comprising a trigger input for receiving a trigger signal,
    wherein the discharge device is configured to discharge the capacitor depending on the trigger signal.

16. A lighting apparatus comprising:
    a light emitting diode arrangement having a plurality of light emitting diodes, and
    a circuit apparatus as claimed in claim 15.

17. The lighting apparatus as claimed in claim 16, wherein the lighting apparatus is comprised in a motor vehicle headlight.

18. A lighting apparatus comprising:
    a light emitting diode arrangement having a plurality of light emitting diodes, and
    a circuit apparatus as claimed in claim 10.

19. The lighting apparatus as claimed in claim 18, wherein the lighting apparatus is comprised in a motor vehicle headlight.

* * * * *